United States Patent
Tujkovic et al.

(10) Patent No.: US 8,223,826 B2
(45) Date of Patent: *Jul. 17, 2012

(54) MEASURING NOISE POWER AT WIRELESS RECEIVERS USING PILOT SYMBOL INFORMATION

(75) Inventors: Djordje Tujkovic, Santa Clara, CA (US); Ying Xia, Santa Clara, CA (US); Robert Lorenz, Santa Clara, CA (US); Sriram Mudulodu, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,587

(22) Filed: Nov. 11, 2010

(65) Prior Publication Data

US 2011/0058486 A1     Mar. 10, 2011

Related U.S. Application Data

(63) Continuation of application No. 11/788,265, filed on Apr. 19, 2007, now Pat. No. 7,835,432.

(60) Provisional application No. 60/793,219, filed on Apr. 19, 2006.

(51) Int. Cl.
*H04B 3/46* (2006.01)
*H04B 17/00* (2006.01)
*H04Q 1/20* (2006.01)

(52) U.S. Cl. ........................................ 375/224; 370/241

(58) Field of Classification Search .................. 375/224, 375/227–228, 285, 350; 370/206, 241, 252
See application file for complete search history.

(56) References Cited

U.S. PATENT DOCUMENTS

| | | | |
|---|---|---|---|
| 5,631,921 A | 5/1997 | Schilling | |
| 5,721,754 A | 2/1998 | Chen | |
| 6,044,106 A | 3/2000 | Suzuki | |
| 6,118,806 A | 9/2000 | Niida et al. | |
| 6,654,408 B1 | 11/2003 | Kadous et al. | |
| 7,187,646 B2 * | 3/2007 | Schramm | 370/206 |
| 7,362,828 B2 | 4/2008 | Peeters et al. | |
| 7,492,721 B2 | 2/2009 | Ishikawa | |

(Continued)

OTHER PUBLICATIONS

International Search Report for PCT/US07/09570, mailed Apr. 21, 2008, 1 page.

*Primary Examiner* — Jean B Corrielus
(74) *Attorney, Agent, or Firm* — Sterne, Kessler, Goldstein & Fox P.L.L.C.

(57) ABSTRACT

Embodiments are directed to a wireless receiver system that utilizes a special structure of pilot symbols used for synchronization and channel estimation in transmission packets to measure noise power at the receiver. The periodicity of the pilot signal sequences is used to extract the noise power from the received signal. Such extraction is achieved by subtracting the received signals from two pilot slots which are separated by the known periodicity of the training sequence. This method relies on the fact that desired signal and system interference signals will cancel out after the subtraction process. Measuring the power of the residual signal after subtraction represents the estimate of the noise power. Several consecutive such residual signals can be first summed up before measuring the power to improve the estimate of the noise power at the receiver. To further improve the performance, estimates of the desired signal produced by a channel estimation block can be first subtracted from each of the received signals on two pilot slots which are then to be subtracted and are separated by the known periodicity of the pilot sequence.

14 Claims, 3 Drawing Sheets

U.S. PATENT DOCUMENTS

| | | |
|---|---|---|
| 7,532,864 B2 | 5/2009 | Fukuoka et al. |
| 7,590,171 B2 | 9/2009 | Chang et al. |
| 7,620,123 B2 | 11/2009 | Li et al. |
| 7,653,161 B2 | 1/2010 | Peeters et al. |
| 2003/0002454 A1* | 1/2003 | Lee et al. ............ 370/328 |
| 2004/0001563 A1 | 1/2004 | Scarpa |
| 2004/0109419 A1* | 6/2004 | Sano et al. ............ 370/320 |
| 2005/0084035 A1* | 4/2005 | Kim et al. ............ 375/295 |
| 2005/0190800 A1 | 9/2005 | Maltsev et al. |
| 2005/0215289 A1* | 9/2005 | Rensburg et al. ...... 455/562.1 |
| 2006/0256885 A1 | 11/2006 | Song et al. |
| 2007/0053452 A1 | 3/2007 | Koo et al. |

* cited by examiner

MEASURING NOISE POWER AT WIRELESS RECEIVERS USING PILOT SYMBOL INFORMATION

CROSS-REFERENCE TO RELATED APPLICATIONS

The present application is a continuation of U.S. patent application Ser. No. 11/788,265 filed Apr. 19, 2007, now U.S. Pat. No. 7,835,432, which makes reference to, claims priority to and claims the benefit of U.S. Provisional Patent Application Ser. No. 60/793,219 filed on Apr. 19, 2006.

TECHNICAL FIELD

The embodiments provided herein relate generally to communication systems, and more specifically to measuring noise power at receivers.

BACKGROUND

In wireless communication systems, the quality of the signal depends in large part on the amount of noise measured at the receiver antenna. In these systems, the noise figure is the ratio of the output noise power to the thermal noise in the input termination at standard noise temperature. The noise figure thus represents the ratio of actual output noise to that which would remain if the device itself was noise free, and provides an indication of the performance of a radio receiver. The noise power is typically used to denote the cumulative effects of noise figure at the receiver and the ambient (e.g. non-system) interference. The knowledge of noise power at the receiver is crucial for several blocks in the transceiver chain, which include, but are not limited to demodulation, decoding, power control, link adaptation, and similar operations.

In general, there are three main sources of noise at the receiver antenna: (1) ambient (non-system) noise or interference which is at or near the same operating frequency range of the desired signals; (2) circuit noise, which is noise introduced or picked up by the circuits or blocks in the RF (radio frequency) stage of the receiver itself; and (3) system or system-like interference, which is introduced by other transmitters or sources of desired signals for other receivers, but not for a particular receiver. In order to design and build effective wireless receivers, it is important to know or at least be able to accurately estimate the noise power at the receiver. However, all of the interference at the receiver may factor into the noise power calculation, including interference from other transmitters, which is technically not noise, but rather system or system-like interference. It is important, therefore, to separate the ambient noise and the circuit noise from the system or system-like interference, in order to obtain a true estimation of noise power at the receiver.

In wireless communication systems, noise power is commonly estimated by measuring the received signal power in time and/or frequency slots that are explicitly not used for data transmission in the system. Those slots are typically known as guard times and guard bands, in time and frequency domain, respectively. In many situations, guard times and guard bands are either not available or are otherwise congested with adjacent channel interference, which would contribute to unrealistically high noise power levels if measured using conventional methods. One example of a current system which is susceptible to such inaccurate noise power measurements is the IEEE 802.16e standard and its Wimax profile version (IEEE P802.16-2004/Corl/D5).

It has been widely asserted that noise power at the receiver cannot be measured on the pilot signals in the IEEE 802.16e standard, however it is desirable to utilize such guard bands to separate ambient noise from system-like signals to measure the actual noise power at the input stage of a receiver.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments are directed to a wireless receiver system that utilizes a special structure of pilot symbols used for synchronization and channel estimation in transmission packets to measure noise power at the receiver. The periodicity of the pilot signal sequences is used to extract the noise power from the received signal. Such extraction is achieved by subtracting the received signals from two pilot slots which are separated by the known periodicity of the training sequence. This method relies on the fact that desired signal and system interference signals will cancel out after the subtraction process. Measuring the power of the residual signal after subtraction represents the estimate of the noise power. Several consecutive such residual signals can be first summed up before measuring the power to improve the estimate of the noise power at the receiver. To further improve performance, estimates of the desired signal produced by a channel estimation block can be first subtracted from each of the received signals on two pilot slots which are then to be subtracted and are separated by the known periodicity of the pilot sequence.

Figure 1:
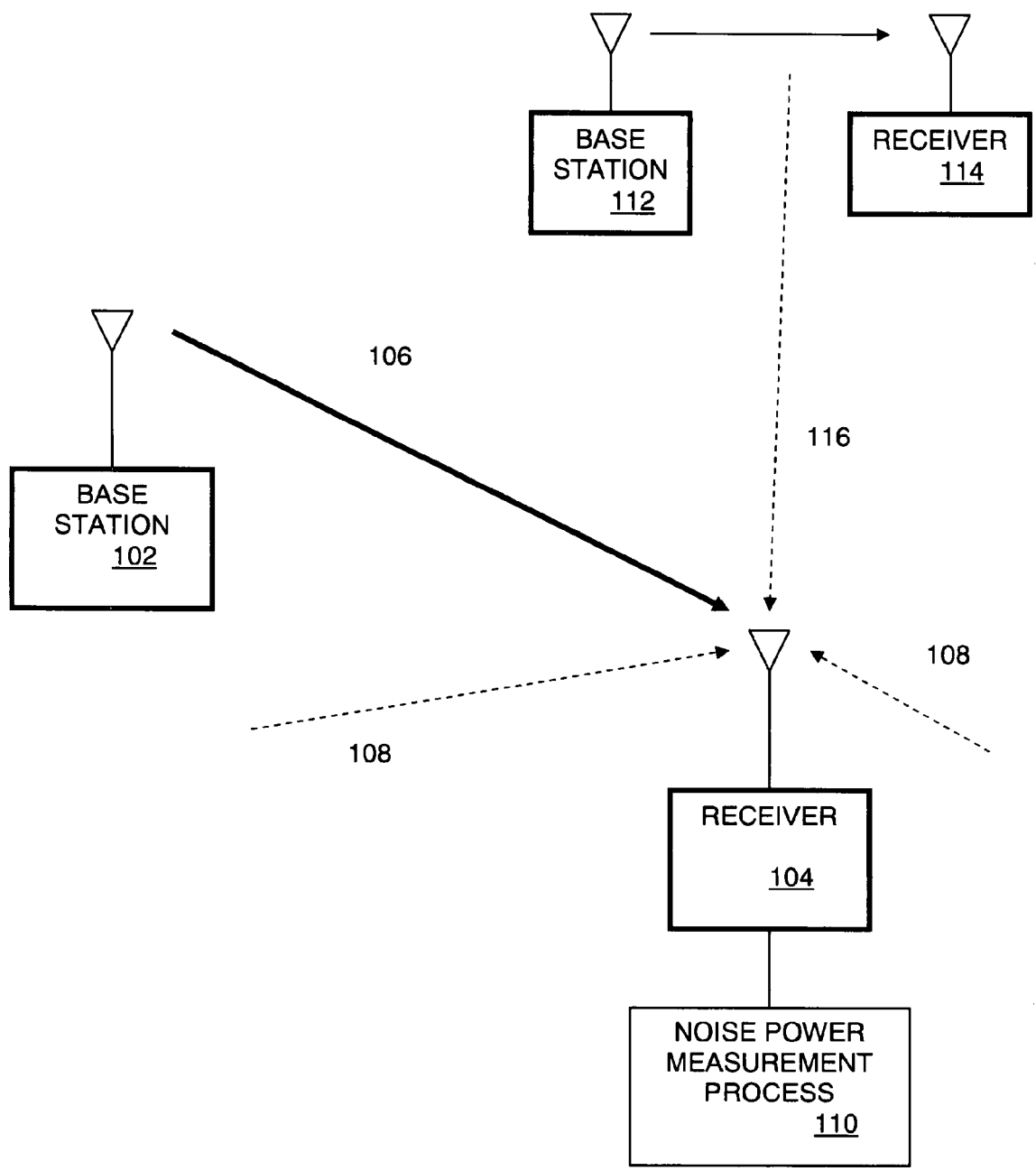
FIG. 1 illustrates a wireless system that includes receiver implementing a noise power measurement system, under an embodiment.

FIG. 1 illustrates a wireless system that includes a noise power measurement system, under an embodiment. In system 100, a base station or similar wireless transmitter 102 transmits a radio or similar wireless signal 106 to receiver 104, such a signal is referred to as a "desired signal." Receiver 104 may also receive one or more interference signals 108 from a variety of sources, such as natural sources or sources of other wireless signals. At least some of interference signals 108 comprise ambient noise, which is noise from any type of source that generates noise in the same or nearly the same operating frequency of the receiver 104. These interference signals 108, along with any internally generated RF interference form noise that does not contain any desired signal components. Another source of interference for receiver 104 can be system noise 116. In many distributed networks that comprise a plurality of transmitters transmitting to a plurality of receivers, such as cellular phone networks, receivers can often pick up signals from other transmitters that are intended for other receivers. Thus, in system 100, a second base station 112 may transmit to second receiver 114. In certain cases, such as if receiver 104 is relatively close to base station 112, it may pickup interference 116 from transmitter 112. This interference signal 110 does not necessarily represent broadband noise, but rather an actual signal that is interfering with proper reception of a desired signal 106 from base station 102. As used herein, the term "noise" means ambient noise, RF noise, and noise from other sources that may interfere with the desired signal, but that are distinct from actual signals from other transceivers in the system that are not desired, and which are referred to as "system-like" interference.

In one embodiment, system 100 of FIG. 1 utilizes data transmission based on frequency-division multiplexing (FDM), where each frequency sub-channel carries a separate stream of data. In a specific embodiment, OFDM (Orthogonal frequency-division multiplexing) is used. In OFDM, the sub-carrier frequencies are selected so that the modulated data streams are orthogonal to one another. This orthogonality allows for high spectral efficiency and simplifies transceiver design since separate filters are not needed for each sub-channel. In general, OFDM is a modulation technique used in 802.11a WLAN, 802.16 and WiMAX technologies for transmitting large amounts of digital data over a radio wave. OFDM works by splitting the radio signal into multiple smaller sub-signals that are then transmitted simultaneously at different frequencies to the receiver. OFDM generally reduces the amount of crosstalk in signal transmissions.

In one embodiment, network 100 includes a receiver 104 that includes or executes a noise power measurement process 110. Noise power measurement process 110 utilizes the fact that the OFDM transmission system includes dedicated slots in time and/or the frequency domain where special training symbols (e.g., pilot signals) are transmitted to enable synchronization and channel estimation at the receiver.

In one embodiment, the noise power measurement process exploits a special structure of pilot symbols, originally introduced for synchronization and channel estimation, to measure noise power at the receiver. More specifically, the noise power measurement process 110 exploits the periodicity in such training symbols' sequence to extract the noise power from the received signal. Such extraction is achieved by subtracting the received signals from two pilot slots which are separated by the known periodicity of the training sequence. The methods of an embodiment rely on the fact that desired signal and system interference signals will cancel out after subtraction. Measuring the power of the residual signal after subtraction represents the estimate of the noise power. Several consecutive such residual signals can be first summed up before measuring the power to improve the estimate of the noise power at the receiver. To further improve the performance, estimates of the desired signal produced by the channel estimation block can be first subtracted from each of the received signals on two pilot slots which are then to be subtracted and are separated by the known periodicity of the training sequence.

In cases where the periodicity of the training sequence is large relative to the inverse of the user's mobility, the bias term in the noise power measurement stemming from non-perfectly canceled desired and system interference signals due their de-correlation on two pilot tones, can be removed by the independent measurement of the user's Doppler and/or de-correlation and power of desired and system interference which are generally available from the PHY measurements block.

Figure 2:
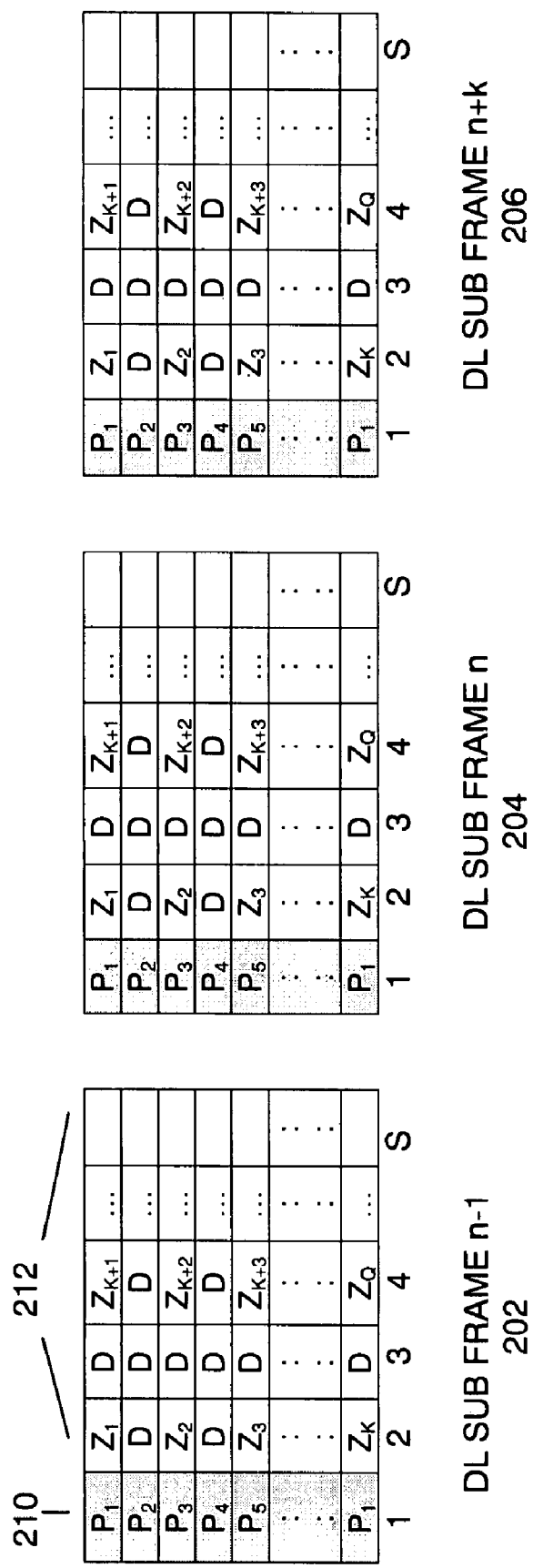
FIG. 2 illustrates an example of orthogonal frequency domain modulation (OFDM) symbols within frames for use with a noise power measuring method, according to an embodiment.

Under an embodiment, each transmission in system 100 is organized in frames which include multiple OFDM symbols in time, such as for IEEE 802.16e and Wimax systems. Each OFDM symbol contains multiple OFDM tones in the frequency domain. FIG. 2 is a diagram that illustrates structure of OFDM sub-frames in a transmission sequence. As shown in FIG. 2, downlink (DL) subframes 202, 204, and 206 are shown as comprising a matrix of OFDM tones and OFDM symbols. The OFDM tones are represented by the rows of the sub-frame matrices (along a vertical frequency axis), and the OFDM symbols are represented by the columns of the sub-frame matrices (along a horizontal time axis). Thus, each OFDM sub-frame in FIG. 2 is shown as having OFDM symbols 1 to s, as transmitted in time t. Each sub-frame includes a pilot slot 210, which is allocated in both time and frequency domain. The first OFDM symbol of each sub-frame, known as the preamble, includes only pilot symbols. The remaining OFDM symbols 212 of a frame are grouped into multiple zones and contain both data and pilot symbols. Thus, as shown in FIG. 2, $P_i$ denotes the OFDM tone position for pilot symbol i in the preamble; $Z_k$ denotes the OFDM tone and symbol position for pilot symbol k within a particular zone; and D denotes the OFDM tone and symbol position for data symbols within a particular zone. Thus, P and Z denote pilot (or training) symbols and D represents the data (payload) of the signal.

Although FIG. 2 illustrates OFDM sub-frames only for downlink transmissions, other embodiments may be directed to other transmission links, such as uplinks or other similar portions of a transmission.

In one embodiment, the noise power measurement process determines which frame positions within each sub-frame carry so-called "pilot" symbols or symbols that are transmitted when no base station or source of desired signals is transmitting. These power symbols or tones occur with a certain periodicity, regardless of absolute position within frames transmitted between different pairs of base stations and receivers.

The noise power measurement process can implement one or more specific computer-implemented methods for measuring noise power ($N_o$) that are applied to pilot symbols of the preamble of the OFDM frames. Each method exploits the fact that the system-like interference may not be exactly coincident with the desired signal, but that the periodicity imposed by the system protocol, as evidenced by the pilot symbol frequency, will be the same. For example, in a cellular telephone network, a different cell transmission between a base station and receiver may have different sequences, however, the property of periodicity of the pilot or power tones is the same as between the receiver and source of the desired signal. This property, however, does not apply to ambient or RF interference. Therefore, subtracting the desired signal and the ambient noise and other noise from a signal based purely on the power tone will leave a noise level that represents the system-like interference alone.

In one embodiment, the noise power measurement process is configured to calculate the values for noise power ($N_0$), using the equations shown below. For each of the equations below, $P_i$ is the tone position for the pilot symbol in the preamble, C is the number of pilot symbols in the preamble, $Y(P_i, n)$ is the received signal in pilot position $P_i$ and frame n after multiplying with the known pilot symbol in that position, and $H(P_i, n)$ is the estimated channel in pilot position $P_i$ and frame n, including any transmit power boosting of the pilots.

$$N_o = \frac{1}{2C} \sum_{i=1}^{C} \text{abs}(Y(P_i, n-1) - Y(P_i, n))^2 \quad (1)$$

This equation (1) yields the average noise as measured on two consecutive frames n and n−1.

$$N_o = \frac{1}{2CF} \sum_{i=1}^{C} \text{abs}\left(\sum_{j=1}^{F} Y(P_i, 2j-1) - Y(P_i, 2j)\right)^2 \quad (2)$$

This equation (2) yields the average noise as measured on two consecutive frames n and n−1, as summed over a number of frames F, and provides improved averaging.

In many wireless networks, the receivers are mobile, in which case fading can become an issue. A base station sends the same signals to any particular receiver, however due to movement of the receiver, the received signal may look different at different times. Due to receiver movement, residual signals can leak into the noise measurement and prevent proper cancellation provided in the equations above. To counteract this effect, the following equation can be executed by the noise power measurement process:

$$N_o = \frac{1}{2C'F} \sum_{i=1}^{C'} \text{abs}\left(\sum_{j=1}^{F} (Y(P_i, 2j-1) - H(P_i, 2j-1)) - (Y(P_i, 2j) - H(P_i, 2j))\right)^2 \quad (3)$$

In this embodiment of the process illustrated by equation (3), the method for measuring noise is applied only to a subset of pilot positions belonging to the serving base station (subset C').

When the periodicity of a training sequence is large compared to the inverse of a user's mobility, the bias term in the noise power measurement stemming from non perfectly canceled desired and system interference signals due their de-correlation on two pilot tones can be removed by the independent measurement of a user's Doppler and/or de-correlation and power of desired and system interference, which are typically available from the physical layer (PHY) measurements block of the receiver circuit.

The above equations represent a noise power measurement methodology based on preamble periodicity. Alternatively, the noise power measurement process can be applied to pilot positions within a zone an OFDM sub-frame. In such a case the method for measuring noise can be applied in one of the following equations:

$$N_o = \frac{1}{2Q} \sum_{i=1}^{Q} \text{abs}(Y(Z_i, n-1) - Y(Z_i, n))^2 \quad (4)$$

$$N_o = \frac{1}{2QF} \sum_{i=1}^{Q} \text{abs}\left(\sum_{j=1}^{F} Y(Z_i, 2j-1) - Y(Z_i, 2j)\right)^2 \quad (5)$$

$$N_o = \frac{1}{2Q'F} \sum_{i=1}^{Q'} \text{abs}\left(\sum_{j=1}^{F} (Y(Z_i, 2j-1) - H(Z_i, 2j-1)) - (Y(Z_i, 2j) - H(Z_i, 2j))\right)^2 \quad (6)$$

In the above equations, the periodicity of the training sequence is equal to the length of one frame. Thus, the zone consists of the symbols after the preamble, as shown by element 212 in FIG. 2. In other embodiments, a zone may be any subset of symbols within a frame. Equations 4, 5 and 6 represent the measurement of noise power based on the periodicity between frames, or so-called "inter-frame" periodicity. Equation (4) yields the average noise as measured on two consecutive zones n and n−1 for a number Q of pilot symbols in the zone; equation (5) yields the average noise as measured on two consecutive zones n and n−1, as summed over a number of frames F; and equation (6), yields the measured noise for a subset of pilot positions belonging to the serving base station (subset Q').

In some cases, for pilot-based measurements in zones, the periodicity of a pilot sequence can be shorter than one frame. That is, for example, pilot symbols on positions $Z_i$ and $Z_{K+i}$ may be the same, which is the case when a periodicity of the training sequence is K. The method for measuring noise in this situation can be accomplished through the calculation of the following equations:

$$N_o = \frac{1}{2K} \sum_{i=1}^{K} \text{abs}(Y(Z_i, n) - Y(Z_{K+i}, n))^2 \quad (7)$$

$$N_o = \frac{1}{2KF} \sum_{i=1}^{K} \text{abs}\left(\sum_{j=1}^{F} Y(Z_i, 2j-1) - Y(Z_{K+i}, 2j)\right)^2 \quad (8)$$

$$N_o = \frac{1}{2K'F} \sum_{i=1}^{K'} \text{abs}\left(\sum_{j=1}^{D} (Y(Z_i, 2j-1) - H(Z_i, 2j-1)) - (Y(Z_{K+i}, 2j) - H(Z_{K+i}, 2j))\right)^2 \quad (9)$$

Equations 7, 8 and 9 represent the measurement of noise power based on the periodicity between within each of the frames, or so-called "intra-frame" periodicity. Equation (7) yields the average noise as measured on two consecutive zones n and n−1 for a number K of pilot symbols in a subzone; equation (5) yields the average noise as measured on two consecutive zones n and n−1, as summed over a number of frames F; and equation (6), yields the measured noise for a subset of pilot positions belonging to the serving base station (subset K').

Figure 3:
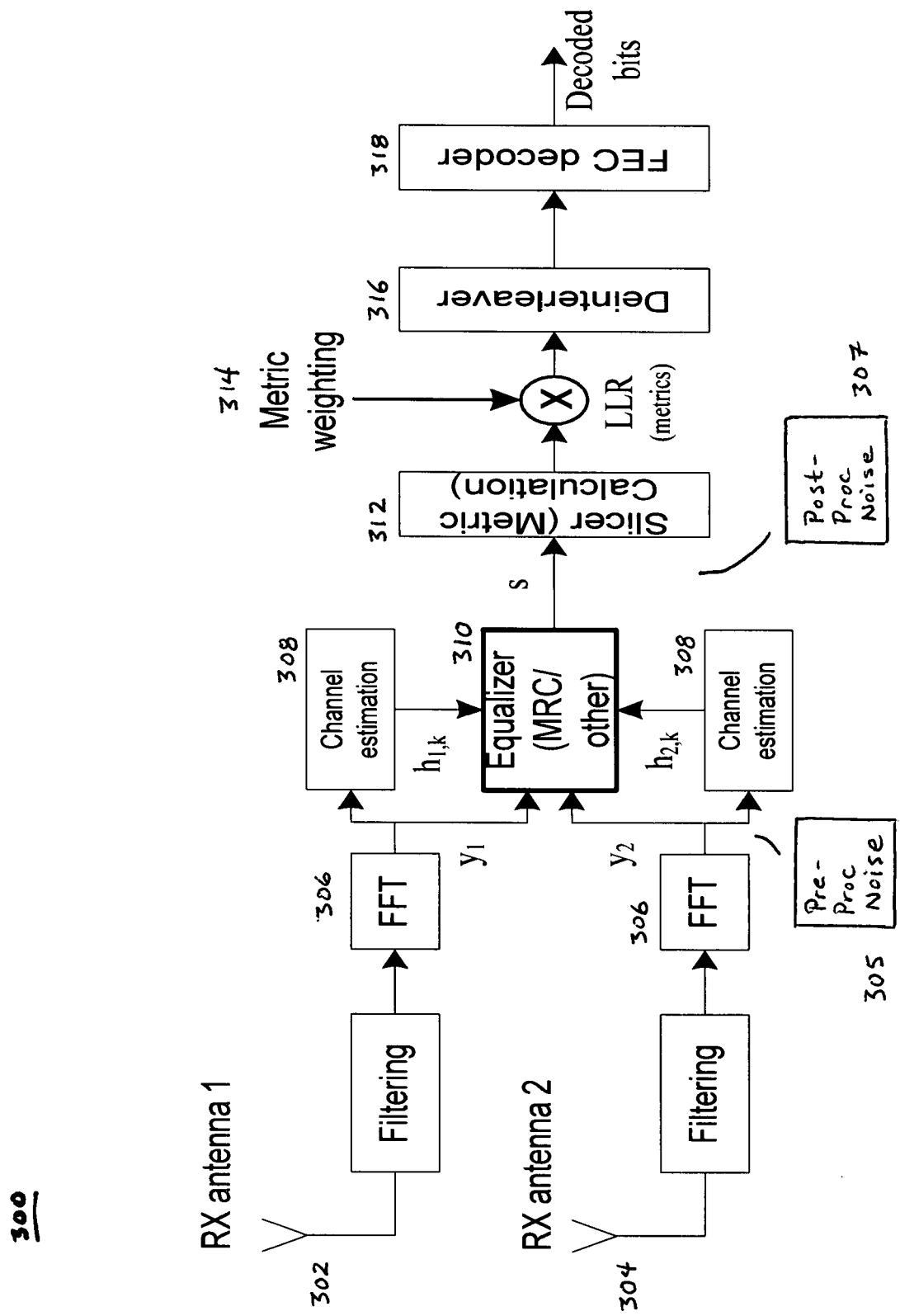
FIG. 3 is a block diagram of a receiver circuit that includes a noise power measurement system, under an embodiment.

For each of the above methods, the noise power $N_0$ represents the sum of noise from ambient interference, RF noise, and other non-system like noise. Any or all of the above described methods can be used to measure the noise power $N_0$ based on an apparent periodicity among the frames of the transmitted signal. Depending upon the processing power of the system, and the periodic element, i.e., preamble, zone, sub-zone, and so on, any of the methods can be implemented in a receiver 104 in an OFDM system. FIG. 3 is a receiver structure in which the noise measuring methods of an embodiment can be used. FIG. 3 illustrates an embodiment of a SIMO (Single Input Multiple Output) receiver that can implement embodiments of the noise power measurement process 110. Receiver 300 includes two receiver antennae 302 and 304, each of which are processed through FFT (Fast Fourier Transform) circuits 306 and channel estimation 308 and equalization 310 circuits. An amount of preprocessing noise 305 and 307 are present at the outputs of the FFT circuits 306. Likewise, post-processing noise is present at the output of the equalizer circuit 310 before the signal is processed by subsequent digital processing circuitry, such as slicer 312, metric weighting circuit 314, de-interleaver 316, and decoder 318.

The noise power measurement process can be implemented as a circuitry incorporated into a receiver, such as receiver 300, or it may be a software or firmware program executed by a processor or similar logic device incorporated in the receiver, or a separate processing circuit coupled to the receiver. Alternatively, it may be implemented as a remote process executed by a processing circuit separate from the receiver, such as in a transmitter or other remote platform.

Embodiments of the noise power measurement process allows a system designer or implementer to determine the noise and interference effects on the data. In general, the power of the pilots may be boosted. Thus, the measured interference may be the sum of noise and a boosted interference measure. In general, the amount of boosting is typically known, thus, knowledge of the noise power $N_0$, as calculated in the above-described methods allows a determination of system like interference levels. The amount of noise and system-like interference in the signal determines the quality of the transmission link and generally dictates how much data can be carried on the line. Such information can be used in various network management processes, such as link adaptation, power control, demodulation, decoding, and the like.

Although embodiments have been described with reference to OFDM transmission systems, it should be noted that the methodology described herein can also be applied to other types of wireless or wired networks that include any type of periodicity based on synchronization mechanisms, such as pilot symbols, and the like.

Aspects of the noise power measurement methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the noise power measurement methods include: microcontrollers with memory (such as electronically erasable programmable read only memory (EEPROM)), embedded microprocessors, firmware, software, etc. Furthermore, aspects of the noise power measurement methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the noise power measurement methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the noise power measurement methods is not intended to be exhaustive or to limit the systems and methods to the precise form disclosed. While specific embodiments of, and examples for, the noise power measurement methods are described herein for illustrative purposes, various equivalent modifications are possible within the scope of other systems and methods, as those skilled in the relevant art will recognize. The teachings of the noise power measurement methods provided herein can be applied to other processing systems and methods, not only for the systems and methods described above.

The elements and acts of the various embodiments described above can be combined to provide further embodiments. These and other changes can be made to the noise power measurement methods in light of the above detailed description.

What is claimed is:

1. A method of measuring noise power in a receiver of a communication system comprising:

receiving, by the receiver, a signal having a component with a known periodicity;

subtracting the received signal from two reference slots that are separated by the known periodicity to generate a residual signal; and generating an estimated noise power by measuring a power of the residual signal.

2. The method of claim 1, wherein the known periodicity is defined by a regular recurrence of a pilot signal transmitted during each frame in a plurality of frames.

3. The method of claim 1, wherein the communication system operates according to a wireless communication protocol.

4. The method of claim 3, wherein the wireless communication protocol comprises one of the group consisting of IEEE 802.11, IEEE 801.16, and WiMax protocols.

5. The method of claim 2, wherein each frame in the plurality of frames comprises a plurality of orthogonal frequency domain modulation (OFDM) symbols.

6. The method of claim 2, wherein the pilot signal is transmitted during a preamble of each frame.

7. The method of claim 2, wherein the pilot signals signal is transmitted during a zone of each frame.

8. An apparatus for measuring noise power in a communication system, the apparatus comprising:

a receiver configured to receive a signal having a component with a known periodicity; and a processor configured to subtract the signal from two reference slots that are separated by the known periodicity to generate a residual signal, and to generate an estimated noise power by measuring a power of the residual signal.

9. The apparatus of claim 8, wherein the known periodicity is defined by a regular recurrence of a pilot signal transmitted during each frame in a plurality of frames.

10. The apparatus of claim 8, wherein the communication system operates according to a wireless communication protocol, wherein the wireless communication protocol comprises one of the group consisting of: IEEE 802.11, IEEE 801.16, and WiMax protocols.

11. The apparatus of claim 9, wherein each frame in the plurality of frames comprises a plurality of orthogonal frequency domain modulation (OFDM) symbols.

12. The apparatus of claim 9, wherein the pilot signal is transmitted during a preamble of each frame.

13. The apparatus of claim 9, wherein the pilot signal is transmitted during a zone of each frame.

14. The apparatus of claim 8, wherein the processor is further configured to remove a bias from the estimated noise power by accounting for a Doppler measurement of a user of the communication system.

* * * * *

UNITED STATES PATENT AND TRADEMARK OFFICE
CERTIFICATE OF CORRECTION

| | | |
|---|---|---|
| PATENT NO. | : 8,223,826 B2 | |
| APPLICATION NO. | : 12/944587 | |
| DATED | : July 17, 2012 | |
| INVENTOR(S) | : Tujkovic et al. | |

It is certified that error appears in the above-identified patent and that said Letters Patent is hereby corrected as shown below:

Column 10, line 22, Claim 7, please replace "wherein the pilot signals signal" with --wherein the pilot signal--.

Signed and Sealed this
Eighteenth Day of September, 2012

David J. Kappos
*Director of the United States Patent and Trademark Office*